(12) United States Patent
Koskela et al.

(10) Patent No.: US 12,003,995 B2
(45) Date of Patent: Jun. 4, 2024

(54) EVENT-BASED ADAPTION OF UE MEASUREMENTS

(71) Applicant: Nokia Technologies Oy, Espoo (FI)

(72) Inventors: Timo Koskela, Oulu (FI); Jussi-Pekka Koskinen, Oulu (FI); Sami Hakola, Kempele (FI); Lars Dalsgaard, Oulu (FI); Juha Karjalainen, Oulu (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 459 days.

(21) Appl. No.: 17/311,171

(22) PCT Filed: Jan. 7, 2020

(86) PCT No.: PCT/FI2020/050009
§ 371 (c)(1),
(2) Date: Jun. 4, 2021

(87) PCT Pub. No.: WO2020/144404
PCT Pub. Date: Jul. 16, 2020

(65) Prior Publication Data
US 2022/0030455 A1 Jan. 27, 2022

Related U.S. Application Data

(60) Provisional application No. 62/791,503, filed on Jan. 11, 2019.

(51) Int. Cl.
*H04W 24/10* (2009.01)
*H04W 52/02* (2009.01)

(52) U.S. Cl.
CPC ....... *H04W 24/10* (2013.01); *H04W 52/0216* (2013.01); *H04W 52/0229* (2013.01); *H04W 52/028* (2013.01)

(58) Field of Classification Search
CPC ............ H04W 24/10; H04W 52/2016; H04W 52/0229; H04W 52/028
(Continued)

(56) References Cited

U.S. PATENT DOCUMENTS

2016/0112149 A1 4/2016 Kim et al.
2019/0058519 A1* 2/2019 Davydov ............... H04W 72/21
(Continued)

FOREIGN PATENT DOCUMENTS

WO 2016/175690 A1 11/2016
WO 2017/012540 A1 1/2017
(Continued)

OTHER PUBLICATIONS

"New SID: Study on UE Power Saving in NR", 3GPP TSG RAN Meetings #80, RP-181463, Agenda: 9.1.8, CATT, Jun. 11-14, 2018, 5 pages.
(Continued)

*Primary Examiner* — Faisal Choudhury
(74) *Attorney, Agent, or Firm* — SQUIRE PATTON BOGGS (US) LLP

(57) ABSTRACT

According to a first embodiment, a method may include receiving, by a user equipment, at least one indication of at least one non-default measurement profile. The method may further include determining, by the user equipment, that at least one predefined condition applies. The method may further include applying, by the user equipment, one or more of at least one adapted measurement, at least one non-adapted measurement, at least one default measurement profile, at least one non-default measurement profile, at least one adapted measurement profile, and at least one non-adapted measurement profile.

19 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0281598 A1* | 9/2019 | Almalfouh | H04W 28/18 |
| 2019/0281660 A1* | 9/2019 | Cui | H04W 88/06 |
| 2020/0059345 A1* | 2/2020 | Pelletier | H04L 1/16 |
| 2021/0242923 A1* | 8/2021 | Takeda | H04W 24/08 |

FOREIGN PATENT DOCUMENTS

| | | |
|---|---|---|
| WO | 2017/118898 A1 | 7/2017 |
| WO | 2017/137445 A1 | 8/2017 |
| WO | 2020/089513 A1 | 5/2020 |

OTHER PUBLICATIONS

"3rd Generation Partnership Project; Technical Specification Group Radio Access Network; NR; Physical layer measurements (Release 15)", 3GPP TS 38.215 V15.3.0, Sep. 2018, pp. 1-15.

"3rd Generation Partnership Project; Technical Specification Group Radio Access Network; NR; Require-ments for support of radio resource management (Release 15)", 3GPP TS 38.133 V15.3.0, Sep. 2018, pp. 1-136.

"RRM aspects of NR UE power saving", 3GPP TSG-RAN WG1 Meeting #94bis, R1-1813184, Agenda: 7.2.9.3, Ericsson, Nov. 12-16, 2018, pp. 1-5.

"UE Power Consumption Reduction in RRM Measurements", 3GPP TSG-RAN WG1 Meeting #94bis, R1-1813449, Agenda: 7.2.9.3, Qualcomm Incorporated, Nov. 12-16, 2018, pp. 1-12.

International Search Report and Written Opinion received for corresponding Patent Cooperation Treaty Application No. PCT/FI2020/050009, dated Mar. 30, 2020, 18 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-475.

"On adaptation aspects for NR UE power consumption reduction", 3GPP TSG RAN WG1 Meeting #95, R1-1812421, Agenda: 7.2.9.2.1, ZTE, Nov. 12-16, 2018, pp. 1-10.

"3rd Generation Partnership Project; Technical Specification Group Radio Access Network; NR; Physical layer procedures for control (Release 15)", 3GPP TS 38.213 V15.3.0, Sep. 2018, pp. 1-101.

"E402 Identification of measurement object corresponding to the serving carrier", 3GPP TSG-RAN WG2 NR #101, R2-1803449, Agenda: 10.4.3.2, Ericsson, Feb. 26-Mar. 2, 2018, 10 pages.

Office Action received for corresponding Indian Patent Application No. 2021470341780, dated Mar. 8, 2022, 6 pages.

Extended European Search Report received for corresponding European Patent Application No. 20737996.7, dated Jul. 22, 2022, 12 pages.

Office action received for corresponding Indonesian Patent Application No. P00202103838, dated May 25, 2023, 3 pages of office action and 2 pages of translation available.

* cited by examiner

EVENT-BASED ADAPTION OF UE MEASUREMENTS

RELATED APPLICATION

This application was originally filed as PCT Application No. PCT/FI2020/050009 on Jan. 7, 2020, which claims priority to U.S. Provisional Application No. 62/791,503 filed on Jan. 11, 2019, each of which is incorporated herein by reference in its entirety.

BACKGROUND

Field

Various communication systems may benefit from improved management of multiple measurement profiles.

Description of the Related Art

3rd Generation Partnership Project (3GPP) technology includes the ability to reduce user equipment power consumption. For example, UE power consumption reduction techniques may be based according to RRM measurements. Currently, new radio (NR) baseline defines a set of features for reducing user equipment radio resource management (RRM) measurements during discontinuous reception.

However, this reduction does not consider any network conditions of the user equipment when adapting the RRM measurements. One example relates to applying conditions related to mobility state and/or UE speed: when the UE is in a low mobility state and/or in a state when measurements to be performed at different times instances are highly correlated, the periodicity of measurements may be reduced.

SUMMARY

In accordance with some example embodiments, a method may include receiving, by a user equipment, at least one indication of at least one non-default measurement profile. The method may further include determining, by the user equipment, that at least one predefined condition applies. The method may further include applying, by the user equipment, one or more of at least one adapted measurement, at least one non-adapted measurement, at least one default measurement profile, at least one non-default measurement profile, at least one adapted measurement profile, and at least one non-adapted measurement profile.

In accordance with some example embodiments, an apparatus may include means for receiving at least one indication of at least one non-default measurement profile. The apparatus may further include means for determining that at least one predefined condition applies. The apparatus may further include means for applying one or more of at least one adapted measurement, at least one non-adapted measurement, at least one default measurement profile, at least one non-default measurement profile, at least one adapted measurement profile, and at least one non-adapted measurement profile.

In accordance with some example embodiments, an apparatus may include at least one processor and at least one memory including computer program code. The at least one memory and the computer program code can be configured to, with the at least one processor, cause the apparatus to at least receive at least one indication of at least one non-default measurement profile. The at least one memory and the computer program code can be further configured to, with the at least one processor, cause the apparatus to at least determine that at least one predefined condition applies. The at least one memory and the computer program code can be further configured to, with the at least one processor, cause the apparatus to at least apply one or more of at least one adapted measurement, at least one non-adapted measurement, at least one default measurement profile, at least one non-default measurement profile, at least one adapted measurement profile, and at least one non-adapted measurement profile.

In accordance with some example embodiments, a non-transitory computer readable medium can be encoded with instructions that may, when executed in hardware, perform a method. The method may include receiving at least one indication of at least one non-default measurement profile. The method may further include determining that at least one predefined condition applies. The method may further include applying one or more of at least one adapted measurement, at least one non-adapted measurement, at least one default measurement profile, at least one non-default measurement profile, at least one adapted measurement profile, and at least one non-adapted measurement profile.

In accordance with some example embodiments, a computer program product may perform a method. The method may include receiving at least one indication of at least one non-default measurement profile. The method may further include determining that at least one predefined condition applies. The method may further include applying one or more of at least one adapted measurement, at least one non-adapted measurement, at least one default measurement profile, at least one non-default measurement profile, at least one adapted measurement profile, and at least one non-adapted measurement profile.

In accordance with some example embodiments, an apparatus may include circuitry configured to receive at least one indication of at least one non-default measurement profile. The circuitry may further be configured to determine that at least one predefined condition applies. The circuitry may further be configured to apply one or more of at least one adapted measurement, at least one non-adapted measurement, at least one default measurement profile, at least one non-default measurement profile, at least one adapted measurement profile, and at least one non-adapted measurement profile.

BRIEF DESCRIPTION OF THE DRAWINGS

For proper understanding of this disclosure, reference should be made to the accompanying drawings, wherein.

DETAILED DESCRIPTION

Figure 1:
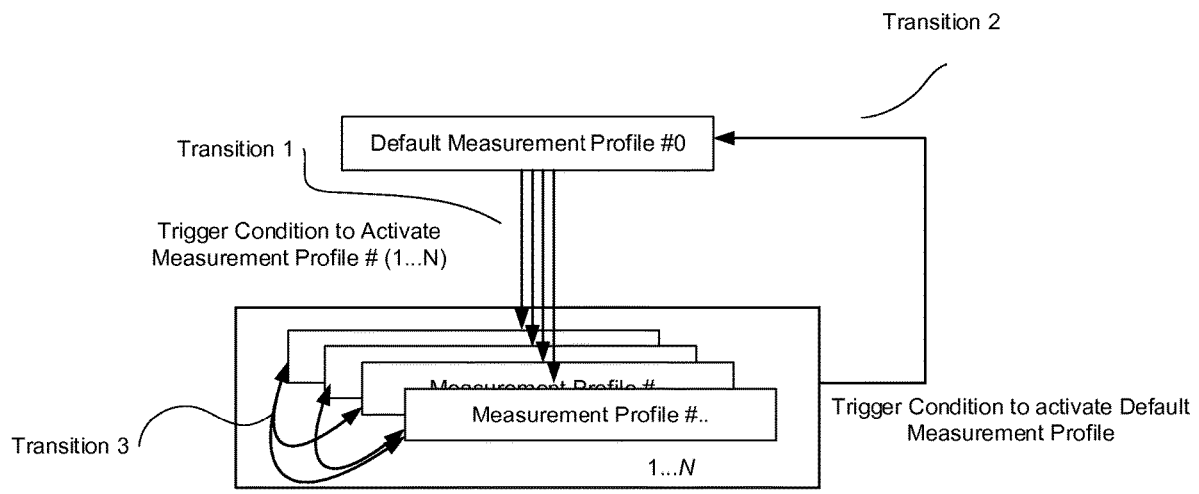
FIG. 1 illustrates an example of different transitions between measurement profiles according to certain embodiments.

In NR, the UE may continuously perform intra-frequency RRM measurements, in addition to other measurements. The UE may also be configured to perform RRM measurements on other layers or RATs. Mobility measurements may be related to inter-cell mobility, such as RRM measurements and/or Layer 3 mobility. Inter-cell mobility radio resource control (RRC) frequently uses signaling, and may be used for configuring measurements for synchronization signal block (SSB)-based, channel state information-reference signal (CSI-RS)-based beam management and/or L1-reference signal received power (RSRP) measurements. For example, a network entity may use MeasObjectNR to configure RRM measurements for a UE.

CSI-RS signals for beam management purposes and L3 mobility purposes may be configured separately. For example, the actual signals, measurements, and reporting configurations may be reported as independent configurations. For beam management purposes, a UE may be configured with one or more non-zero-power (NZP)-CSI-RS configurations, while for L3 mobility purposes, the UE may be configured with CSI-RS for mobility.

In addition, SSB signals can be used for both beam management and L3 mobility. For example, SSB-based measurements, such as those associated with beam management of SSB resources to be used for L1-RSRP reporting, may be explicitly configured. In contrast, current specifications of SSB-based measurements for L3 mobility may be performed by the UE during an SS block-based RRM measurement timing configuration (SMTC) window. The SMTC window may determine the time duration where the UE can expect SSB time locations, as well as where the UE performs measurements of any SSBs of any cell on the frequency layer.

An SMTC window defines the time duration and periodicity for SSB-based RRM measurements. The UE may then be given the SMTC window for IDLE mode measurements (SMTC), as well as for the CONNECTED mode, according to one or two separate SMTC configurations (STMC1, SMTC2). The UE may be configured with two SMTCs only on the serving carrier; otherwise, only one SMTC may be configured. With respect to multiple SMTCs, a primary measurement timing configuration may indicate the periodicity and offset value for the SMTC window, as well as the duration in subframes.

For STMCs associated only with a serving carrier, secondary measurement timing configurations for SSBs corresponding with specific physical cell identifiers may be listed in the configuration. For SSBs indicated in the SMTC1, the second/alternative second periodicity may be indicated by a periodicity in SMTC2. Periodicity in SMTC2 may only be set to a value shorter than the periodicity of the SMTC1. Additionally, SMTC1 may be a multiple of SMTC2. For example, if the periodicity of SMTC1 is configured as SF10, the periodicity of SMTC2 may only be set to SF5. SMTC2 may use the offset and duration value of SMTC1.

Currently, UE measurement period requirements are scaled in DRX based on the DRX configuration, specifically, DRX cycle length. The measurement periods for intra frequency measurements FR1 and FR1 without measurements gaps with different DRX cycle length for SSB based RRM may be described as follows:

| $T_{SSB\_measurement\_period\_intra}$ | |
|---|---|
| DRX cycle (FR1) | |
| No DRX | max[200 ms, ceil(5 × $K_p$) × SMTC period] |
| DRX cycle ≤ 320 ms | max[200 ms, ceil(1.5 × 5 × $K_p$) × max(SMTC period, DRX cycle)] |
| DRX cycle > 320 ms | ceil(5 × $K_p$) × DRX cycle |

-continued

| $T_{SSB\_measurement\_period\_intra}$ | |
|---|---|
| DRX cycle (FR2) | |
| No DRX | max[400 ms, ceil($M_{meas\_period\_w/o\_gaps}$ × $K_p$ × $K_{RLM}$) × SMTC period]$^{Note\ 1}$ |
| DRX cycle ≤ 320 ms | max[400 ms, ceil(1.5 × $M_{meas\_period\_w/o\_gaps}$ × $K_p$ × $K_{RLM}$) × max(SMTC period, DRX cycle)] |
| DRX cycle > 320 ms | ceil($M_{meas\_period\_w/o\_gaps}$ × $K_p$ × $K_{RLM}$) × DRX cycle |

NOTE 1:
If different SMTC periodicities are configured for different cells, the SMTC period in the requirement is the one used by the cell being identified When the measurement gaps are not overlapping with SMTC periods, a $K_p$ value of 1 may be used. For FR2 when RLM-RS outside measurement gap is fully overlapping with intra-frequency SMTC, $K_{RLM}$ may be 1.5; otherwise $K_{RLM}$ may be 1.

Currently in NR, RRM measurement configurations are explicitly provided to user equipment using RRC signalling Provisioning of the configuration is determined by network implementation. For example, the network may provide the UE with a new configuration as frequently as it determines necessary. However, the RRM measurement configuration is not adapted or changed dynamically; it is assumed that UE measurement configuration is semi-static due to the high signalling overhead required, as well as UE delays in new connections when applying a new configuration.

Various techniques have been proposed for saving UE power for RRM measurements, such as where the UE would be pre-configured with multiple measurement configurations or measurement profiles using RRC signaling. The network may then use L1/L2 (DCI/MAC CE) signaling to activate a specific measurement configuration/profile. Once the network has indicated UE to use specific measurement profile, it would need to keep track of all UE conditions. For example, the UE reporting, UE location in a cell, and UE conditions to be able to switch the profiles would need to be tracked, which may require significant increases in signaling overhead.

Certain embodiments described below may overcome these disadvantages by managing measurement profiles more efficiently. For example, measurement profiles may include one or more measurement configurations which include measurement parameters, such as those included in measobjectNR, for specific scenarios based on the immediate measurement requirements. The measurement profiles may also be adapted according to UE measurement requirements, such as measurement periods for RRM, beam management measurements, beam failure detection/recovery, and radio link monitoring or even measurement reporting of RRM/beam management measurements.

Certain embodiments described herein may have various benefits and/or advantages to overcome the disadvantages described above. For example, signalling overhead may be reduced by using multiple profiles/configurations that have been explicitly activated. However, it is desirable for user equipment to be capable of making this determination autonomously, as well in response to event-based triggering, where measurement configurations determine which profiles to use. In addition, user equipment may use multiple measurement profiles without explicit network management after an initial configuration signal has been provided to the user equipment, improving reliability and latency. Thus, certain embodiments are directed to improvements in computer-related technology.

In some embodiments, when the UE has been configured with multiple measurement profiles, one of the profiles may be determined to be a default measurement profile. For example, default profiles may be explicitly indicated by the network and/or determined based on a profile ID. For example, the user equipment may determine a lowest (or highest) or first configured measurement profile ID is the default profile. In another example, the default profile or measurement configuration where UE is not adapting the measurements, such as to save power, may potentially be allowed to relax measurements. As another example, the default profile may not permit any relaxation of measurements. In another example, a default profile may be defined that permits the adaptation of the measurements, and a non-default profile may be defined that prevents adaptation. Various embodiments may include a default profile being a bandwidth part specific or a bandwidth part, with dedicated measurement profiles that are activated when the UE switches to specific BWP.

Figure 2:
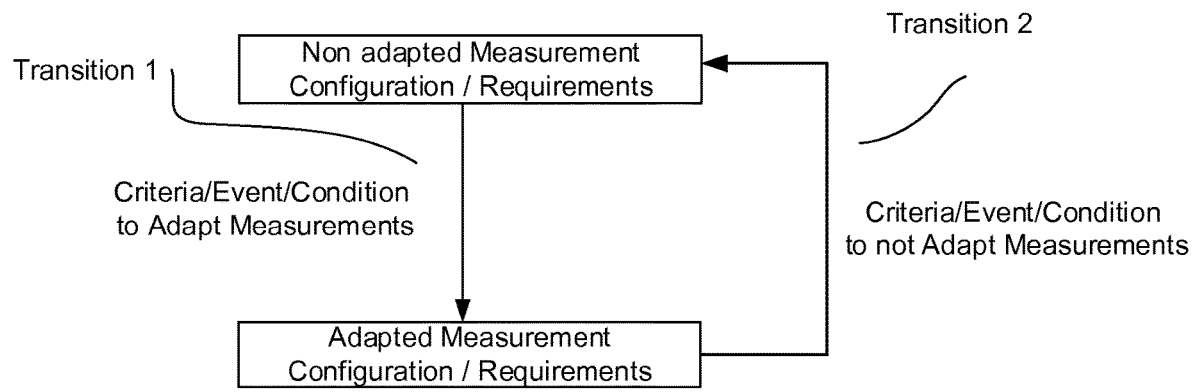
FIG. 2 illustrates an example of transitions between adapted and non-adapted measurement profiles according to certain embodiments.

When the network signals to the UE that the UE should switch to a non-default measurement profile and/or the UE autonomously determines that specific conditions apply, such as that UE may be in low mobility/stationary state where it is allowed to relax/reduce L3 mobility/beam management measurements, the UE may monitor trigger conditions when it is not allowed to adapt measurements and/or is required to switch to default profile without involvement by the network. Alternatively or additionally, the UE may monitor trigger conditions to switch between different non-default measurement profiles and/or to any non-default profile, when conditions apply. FIG. 1 illustrates an example of different transitions between measurement profiles according to certain embodiments, while FIG. 2 illustrates an example of transitions between adapted and non-adapted measurement profiles according to certain embodiments. Specifically, the switching of profiles may be from a default profile to an adapted measurement profile, from an adapted profile to another adapted profile, or a transition back to the default profile. Based on FIG. 2, it should be understood throughout the methods and examples described herein that the "default" profile (MSP) may refer to a configuration where the measurements are not adapted, while the "non-default" profile may refer to a profile, state, or condition where measurements are adapted for, for example, power saving. Also, although the concept of MSP or profile is used throughout the document herein, it should be understood that UE may simply have conditions where it adapts measurements. For example, the user equipment may use different values of measurement configuration parameters, measurement periods, and the like when it determines or is signaled by the network entity to adapt measurements, without explicitly activating any profile. The UE may be in a state where it adapts the measurements. As counterpart, the UE may have a state where it does not adapt measurements. Specific conditions may apply when the UE determines to switch between the profiles and/or the states where it adapts measurements.

Figure 3:
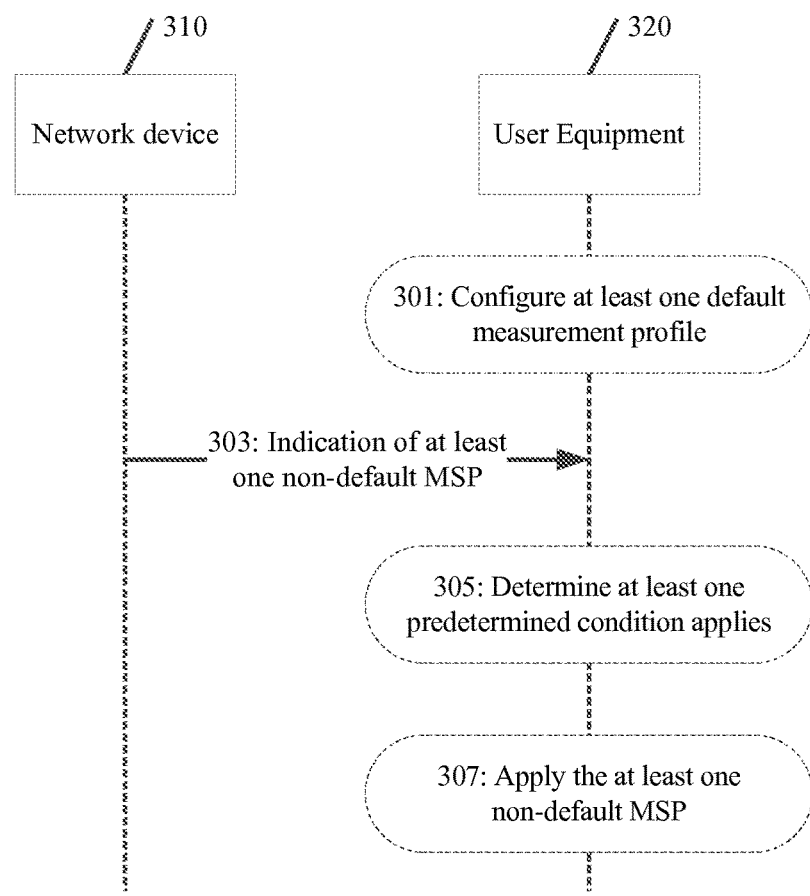
FIG. 3 illustrates an example signaling diagram according to certain embodiments.

FIG. 3 illustrates a signaling diagram according to certain embodiments. User equipment 320 may be similar to user equipment 520 in FIG. 5, and network entity 310 may be similar to network entity 510 in FIG. 5. Although only a single user equipment (UE) and network entity (NE) are illustrated, a communications network may contain one or more of each of these entities. In step 301, UE 320 may determine and/or configure at least one default measurement profile (MSP). In step 303, UE 320 may receive at least one indication of at least one non-default MSP. The at least one indication may be received from NE 310. In some embodiments, the at least one indicated non-default MSP and/or the default MSP may be one or more of cell-specific; cell group-specific; RAN notification area-specific; tracking area-specific; frequency layer-specific; and BWP-specific.

In step 305, UE 320 may determine that at least one predefined condition applies. In step 307, UE 320 may apply the at least one non-default MSP (or profile where measurements are adapted). In some embodiments, UE 320 may, upon receiving the at least one indication of at least one non-default MSP, initiate at least one timer. The timer may be associated with applying at least one particular MSP instead of, or in addition to, the default MSP. While the timer is running, UE 320 may apply the at least one particular MSP until at least one other condition changes the applied MSP. When the timer expires, UE 320 may revert back to the default MSP. However, UE 320 may also revert to the default MSP before the timer expires if a specific trigger overriding the timer applies. For example, when the timer expires, UE 320 may report to NE 310 the current state of at least one evaluated network condition associated with adapting at least one UE measurement, such as at least one mobility state, for example, which indicates that UE 310 is not moving and/or a low mobility UE. This may enable the network to implement at least one reactive measurement profile associated with adapting measurements.

In certain embodiments, UE 320 may apply the indicated non-default (or default) MSP when a particular condition is triggered, such as with downlink and/or uplink inactivity and/or activity. For example, at least one configuration adaptation timer may be configured for UE 320, which may be associated with using broadcast and/or dedicated signaling. In some embodiments, the at least one configuration adaptation timer may be started and/or restarted each time UE 320 transmits and/or receives data, such as one or more of physical layer (PHY), medium access control (MAC), radio link control (RLC), packet data convergence protocol (PDCP), service data adaptation protocol (SDAP), and internet protocol (IP).

Additionally or alternatively, when the at least one configuration adaption timer expires, UE 320 may change the active and/or default MSP to the indicated non-default MSP, or from non-default to default. It should be understood that, in any embodiment or example described herein, the UE may switch from non-default to default profile (profile or measurement adaptation state or mobility state or power saving state where certain configuration parameters are adapted), from default profile to non-default profile, or from a non-default profile to non-default profile based on one or more of the trigger conditions or timers described herein. Various embodiments may also use multiple configuration adaptation timers, with one or more configuration adaptation timers associated with one or more MSPs. In several embodiments, if the amount and/or periodicity of transmitted and/or received data exceeds at least one predefined threshold, UE 320 may change the active MSP. UE 320 may also indicate to NE 310 that UE 320 has switched the applied MSP, such as with PHY, MAC, and/or radio resource control (RRC) signaling.

In some embodiments, UE 320 may activate a specific MSP when UE 320 switches to a default BWP, such as due to an expiration of a bwp-inactivity Timer and/or due to at least one explicit BWP switching command causing UE 320 to switch to the at least one default BWP. For example, when UE 320 switches from the default BWP to at least one non-default BWP, UE 320 may use at least one BWP-specific measurement profile and/or default measurement profile.

According to some embodiments, additionally or alternatively to the measurements, the UE may be request, or UE may provide network assistance information on, which parameters the network should configure for power saving by the UE. For example, the UE may propose more suitable SearchSpace and ControlResourceSet configuration (including one or more parameters and/or parameter values for the configurations) which is optimal for the UE's current traffic and/or power saving characteristics. After the indication from the UE network can configure new configuration for the said parameters for UE. UE may also indicate preferred values for the parameters. In one example, network may ignore the UE proposal about the configuration or network can take one or more of the configuration proposal into account when configuring the new more suitable configuration for the UE. As an example the SearchSpace configuration parameters that UE may indicate or propose to adapt/change may be one or more of following (as in 38.331 3GPP NR RRC specification):

monitoringSlotPeriodicityAndOffset: less frequent search space configurations allow the UE to do reduced PDCCH decodings.

nroCandidates: number of PDCCH candidates per aggregation level. Less candidates, affects the UE blind decoding complexity and by reducing the candidate numbers, the blind search can be done faster, enabling earlier micro-sleep (if no PDSCH allocated to same slot) or reduced complexity/processing.

As another example the ControlResourceSet configuration parameters that UE may indicate can be one or more of following:

duration: time duration of the CORESET in number of symbols Minimizing CORESET duration (in number of symbols) together with fast control channel decoding, would enable UE to have more efficient micro sleep by allowing to go to sleep earlier.

frequencyDomainResources: frequency domain resources for the CORESET. Reducing CORESET BW the PDCCH reception related activity can be reduced, i.e. the channel estimation complexity is reduced resulting lower power consumption.

precoderGranularity: precoder granularity the channel estimation effort related for (blind) decoding of different candidates can be reduced.

reg-BundleSize: size of the resource element group bundle size.

As a further example UE may be configured to adapt the e.g. SearchSpace or ControlResourceSet configurations and using the conditions exit the adapted configuration and apply the non-adapted configuration. In one example, the adaptation can be also part of a UE configuration (i.e applies for all profiles) or a default configuration.

According to some embodiments, UE 320 may change from a non-discontinuous reception (DRX) to DRX operation, for example, due to the expiration of a drx-inactivity Timer and/or apply a specific MSP or adaptation state for measurements or for power saving (e.g., apply different parameters for configuration, as described herein). UE 320 may also perform at least one beam recovery procedure. For example, where UE 320 has declared a beam failure, such as where a beam failure instance counter at the MAC layer has reached a maximum value and beam failure is therefor declared, and/or at least N beam failure instances have been indicated to a higher layer, where N may be consecutive indications or N within a time window or the beam failure instance counter implemented at MAC layer has reached value N, UE 320 may exit from at least one measurement adaptation state or low mobility/stationary mobility state, such as where RRM measurements (or beam management measurements, measurement periods, parameters e.g. in measurement object or any parameter that has been adapted or changed or reduced) have been reduced, adapted or relaxed. Exiting such states may mean that the UE changes to one of a default measurement profile, non-adapted profile, or another measurement profile. Alternatively, the UE may not consider itself to be, for example, in a low mobility/stationary state where, in some cases, the UE measurements may be relaxed, reduced, or adapted, or UE power saving may be enabled by adapting a UE configuration, for example, SearchSpace/ControlResourceSet parameters when beam failure has been declared or beam failure instances, as described herein, have been indicated or counted. In some embodiments, UE 320 may receive at least one wake-up signal, such as a reference signal or downlink control information (DCI), directing UE 320 to switch to a DRX duration, including an active timer similar to OnDuration.

In certain embodiments, at least one wake-up signal may indicate to the UE that the UE needs to decode PDCCH on the next OnDuration of a DRX cycle, and/or that the UE should start decoding PDCCH on starting from specific time instance onwards), while an absence of such a wake-up signal may indicate to the UE that the UE does not need to decode PDCCH during an on-duration or at a specific time instance. These are merely examples of wake-up signal and related procedure. When the UE detects the transmission of a wake-up signal, it may indicate that the network has data to be transmitted for the UE and, thus, it may trigger the UE to switch to a specific measurement profile (default/non-default or exit adaptation state or low mobility state). Similarly, when the UE determines that it has uplink data in the transmission buffer, it may trigger the UE to switch to a specific profile and/or exit from adaptation state or power saving state or low mobility state. Furthermore, at least one anomaly with at least one radio link may be detected, where an out of synchronization (OOS) status may be indicated to a higher layer. Alternatively, when a radio link problem has been declared, such as where T310 has been started, and/or a radio link has been declared, the UE may exit the adaptation state to default or non-adapted state, as described herein.

In some embodiments, at least one preconfigured trigger condition may be associated with at least one specific MSP, for example, a default or non-default, or it may exit measurement adaptation state or low mobility state. For example, when at least one preconfigured trigger condition is satisfied, UE 320 may use the at least one specific MSP. The at least one preconfigured trigger condition may include one or more of the detection of at least one new cell and/or neighbor; at least one change in the strongest neighbor cell; at least one measurement quantity, such as RSRP/RSRQ/SINR/BLER exceeding/lacking below a predefined threshold level; and at least one change in a serving and/or strongest beam.

Certain embodiments may include at least one trigger condition, such as a bitmap, which may be associated with at least one specific MSP. For example, four trigger conditions (cond_trig_1, cond_trig_2, cond_trig_3, cond_trig_4) may be associated with MSP #1 [0 0 1 1] and MSP #2 [1 0 0 0].

Additionally or alternatively, at least one pre-configuration parameter for different trigger conditions may be transmitted by NE 310 to UE 320, such as according to RRC signaling.

Figure 4:
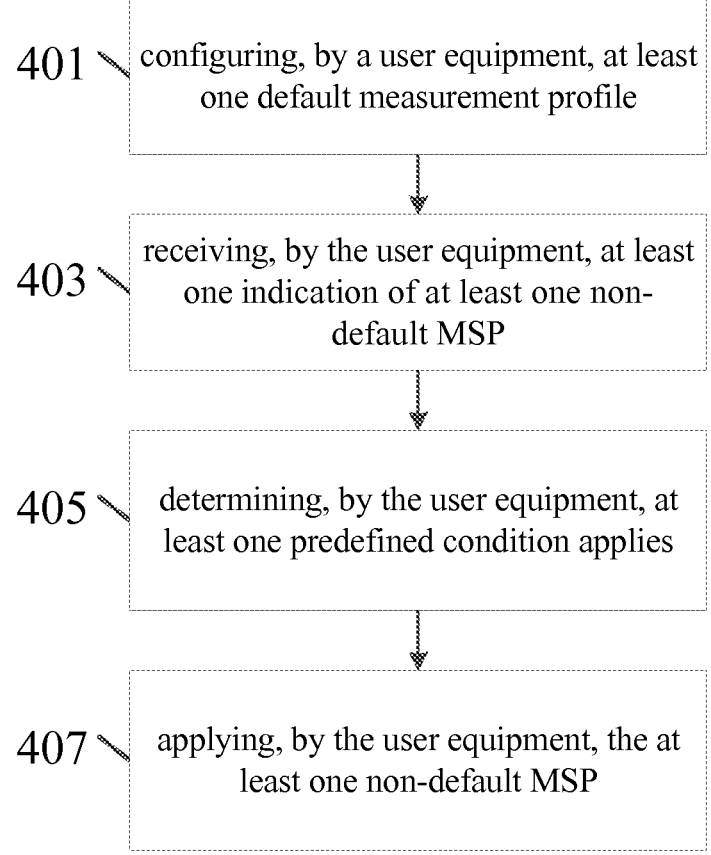
FIG. 4 illustrates an example of a method according to certain embodiments.
Figure 5:
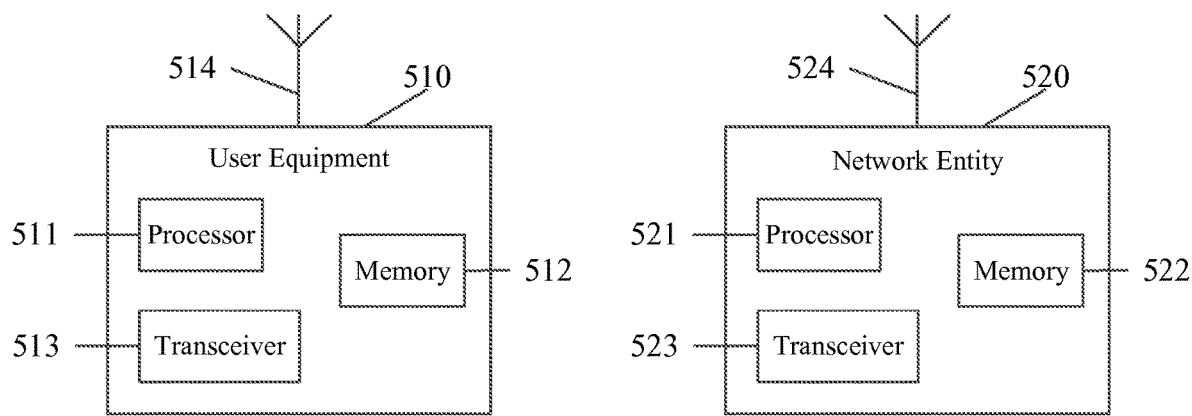
FIG. 5 illustrates an example of a system according to certain embodiments.

FIG. 4 illustrates an example of a method performed by a UE, for example, UE 510 in FIG. 5. In step 401, the UE may configure at least one MSP. In step 403, the UE may receive at least one indication of at least one non-default MSP. The at least one indication may be received from a NE, such as NE 520 in FIG. 5. In some embodiments, the at least one indicated non-default MSP and/or the default MSP may be one or more of cell-specific; cell group-specific; RAN notification area-specific; tracking area-specific; frequency layer-specific; and BWP-specific.

In step 405, the UE may determine that at least one predefined condition applies. In step 407, the UE may apply the at least one non-default MSP. In some embodiments, the UE may, upon receiving the at least one indication of at least one non-default MSP, initiate at least one timer. The timer may be associated with applying at least one particular MSP instead of, or in addition to, the default MSP. While the timer is running, the UE may apply the at least one particular MSP until at least one other condition changes the applied MSP. When the timer expires, the UE may revert back to the default MSP. However, the UE may also revert to the default MSP before the timer expires if a specific trigger overriding the timer applies. For example, when the timer expires, the UE may report to the NE the current state of at least one evaluated network condition associated with adapting at least one UE measurement, such as at least one mobility state, for example, which indicates that the UE is not moving and/or a low mobility UE. This may enable the network to implement at least one reactive measurement profile associated with adapting measurements.

In certain embodiments, the UE may apply the indicated non-default MSP when a particular condition is triggered, such as with downlink and/or uplink inactivity and/or activity. For example, at least one configuration adaptation timer may be configured for the UE, which may be associated with using broadcast and/or dedicated signaling. In some embodiments, the at least one configuration adaptation timer may be started and/or restarted each time the UE transmits and/or receives data, such as one or more of PHY, MAC, RLC, PDCP, SDAP, and IP.

Additionally or alternatively, when the at least one configuration adaption timer expires, the UE may change the active and/or default MSP to the indicated non-default MSP. Various embodiments may also use multiple configuration adaptation timers, with one or more configuration adaptation timers associated with one or more MSPs. In several embodiments, if the amount and/or periodicity of transmitted and/or received data exceeds at least one predefined threshold, the UE may change the active MSP. The UE may also indicate to the NE that the UE has switched the applied MSP, such as with PHY, MAC, and/or RRC signaling.

In some embodiments, the UE may activate a specific MSP when the UE switches to a default BWP, such as due to an expiration of a bwp-inactivity Timer and/or due to at least one explicit BWP switching command causing the UE to switch to the at least one default BWP. For example, when the UE switches from the default BWP to at least one non-default BWP, the UE may use at least one BWP-specific measurement profile and/or default measurement profile.

According to some embodiments, the UE may change from a non-DRX to DRX operation, for example, due to the expiration of a drx-inactivityTimer. The UE may also perform at least one beam recovery procedure. For example, where the UE has declared a beam failure and/or at least N beam failure instances have been indicated to a higher layer, the UE may exit from at least one measurement adaptation state, such as where RRM measurements have been reduced. In some embodiments, the UE may receive at least one wake-up signal, such as a reference signal or DCI, directing the UE to switch to a DRX duration, including an active timer similar to OnDuration. Furthermore, at least one anomaly with at least one radio link may be detected, where an OOS status may be indicated to a higher layer.

In some embodiments, at least one preconfigured trigger condition may be associated with at least one specific MSP. For example, when at least one preconfigured trigger condition is satisfied, the UE may use the at least one specific MSP. The at least one preconfigured trigger condition may include one or more of the detection of at least one new cell and/or neighbor; at least one change in the strongest neighbor cell; at least one measurement quantity, such as RSRP exceeding/lacking below a predefined threshold level; and at least one change in a serving and/or strongest beam.

Certain embodiments may include at least one trigger condition, such as a bitmap, which may be associated with at least one specific MSP. For example, four trigger conditions (cond_trig_1, cond_trig_2, cond_trig_3, cond_trig_4) may be associated with MSP #1 [0 0 1 1] and MSP #2 [1 0 0 0].

Additionally or alternatively, at least one pre-configuration parameter for different trigger conditions may be transmitted by the NE to the UE, such as according to RRC signaling.

FIG. 5 illustrates an example of a system according to certain embodiments. In one embodiment, a system may include multiple devices, such as, for example, user equipment 510 and/or network entity 520.

User equipment 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 520 may be one or more of a base station, such as an evolved node B (eNB) or 5G or New Radio node B (gNB), a serving gateway, a server, and/or any other access node or combination thereof. Network entity 520 may also be similar to user equipment 510. Furthermore, user equipment 510 and/or network entity 520 may be one or more of a citizens broadband radio service device (CBSD).

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
BW Bandwidth
BWP Bandwidth Part
CSI-RS Channel State Information-Reference Signal
DCI Downlink Control Information
DL Downlink
DRX Discontinuous Reception
eMBB Enhanced Mobile Broadband
eNB Evolved Node B
EPC Evolved Packet Core
gNB Next Generation eNB
GPS Global Positioning System
LTE Long-Term Evolution
MAC Medium Access Control
MME Mobility Management Entity
MSP Measurement Profile
MTC Machine-Type Communications
NE Network Entity
NR New Radio
NZP Non-Zero-Power
PDCCH Physical Downlink Control Channel
PDCP Packet Data Convergence Protocol
PDSCH Physical Downlink Shared Channel
PHY Physical Layer
RAN Radio Access Network
RLC Radio Link Control
RRM Radio Resource Management
RSRP Reference Signal Received Power
SDAP Service Data Adaptation Protocol
SMTC SS Block-Based RRM Measurement Timing Configuration
SSB Synchronization Signal Block/Physical Broadcast Channel
UE User Equipment
UL Uplink
WLAN Wireless Local Area Network

The invention claimed is:

1. A method, comprising:
receiving, by a user equipment, at least one indication of at least one non-default measurement profile;
determining, by the user equipment, that at least one predefined condition applies;
upon determining that the at least one predefined condition applies, applying, by the user equipment, at least one adapted measurement profile adapted according to one or more of at least one beam failure detection measurement requirement and at least one radio link monitoring measurement requirement; and
upon at least one predetermined number of failure instances having been indicated to a higher layer, transitioning, by the user equipment, from at least one adaptation state to at least one default or non-adapted state.

2. The method according to claim 1, further comprising: configuring, by the user equipment, at least one default measurement profile.

3. The method according to claim 1, further comprising: upon receiving the at least one indication of at least one non-default measurement profile, initiating, by the user equipment, at least one timer.

4. The method according to claim 1, further comprising: applying, by the user equipment, the at least one adapted measurement profile until at least one other condition changes the applied measurement profile while the timer is running.

5. The method according to claim 1, further comprising: reporting, by the user equipment, the current state of at least one evaluated network condition associated with adapting at least one user equipment measurement when the timer expires.

6. An apparatus, comprising: at least one processor; and at least one memory including computer program code, wherein the at least one memory and the computer program code are configured to, with the at least one processor, cause the apparatus to:
receive at least one indication of at least one non-default measurement profile;
determine that at least one predefined condition applies;
upon determining that the at least one predefined condition applies, apply at least one adapted measurement profile adapted according to one or more of at least one beam failure detection measurement requirement and at least one radio link monitoring measurement requirement; and
upon at least one predetermined number of failure instances having been indicated to a higher layer, transition from at least one adaptation state to at least one default or non-adapted state.

7. The apparatus according to claim 6, wherein the apparatus is further configured to:
configure at least one default measurement profile.

8. The apparatus according to claim 6, wherein the apparatus is further configured to:
upon receiving the at least one indication of at least one non-default measurement profile, initiate at least one timer.

9. The apparatus according to claim 6, wherein the apparatus is further configured to:
apply the at least one adapted measurement profile until at least one other condition changes the applied measurement profile while the timer is running.

10. The apparatus according to claim 6, wherein the apparatus is further configured to:
report the current state of at least one evaluated network condition associated with adapting at least one user equipment measurement when the timer expires.

11. The apparatus according to claim 6, wherein the apparatus is further configured to:
apply the indicated non-default measurement profile when a particular condition is triggered.

12. The apparatus according to claim 6, wherein the particular condition is associated with downlink and/or uplink inactivity and/or activity.

13. The apparatus according to claim 6, wherein the at least one timer is started and/or restarted each time the user equipment transmits and/or receives data.

14. The apparatus according to claim 6, wherein the apparatus is further configured to:
activate a specific measurement profile when the user equipment switches to a default measurement profile.

15. The apparatus according to claim 6, wherein the switch to a default measurement profile is in response to an expiration of a bwp-inactivityTimer and/or due to at least one explicit measurement profile switching command causing the user equipment to switch to the at least one default measurement profile.

16. The apparatus according to claim 6, wherein the apparatus is further configured to:
change from a non-discontinuous reception (DRX) operation to DRX operation.

17. The apparatus according to claim 6, wherein the apparatus is further configured to:
upon declaring at least one radio link anomaly and/or problem, transition from at least one adaptation state to at least one default or non-adapted state.

18. The apparatus according to claim 6, wherein the at least one preconfigured trigger condition is associated with at least one specific measurement profile.

19. A non-transitory computer-readable medium encoding instructions that, when executed in hardware, perform a process according to claim 1.

* * * * *